No. 826,964. PATENTED JULY 24, 1906.
C. H. REYNOLDS.
SAW SHARPENING APPARATUS.
APPLICATION FILED JUNE 14, 1905.
3 SHEETS—SHEET 1.
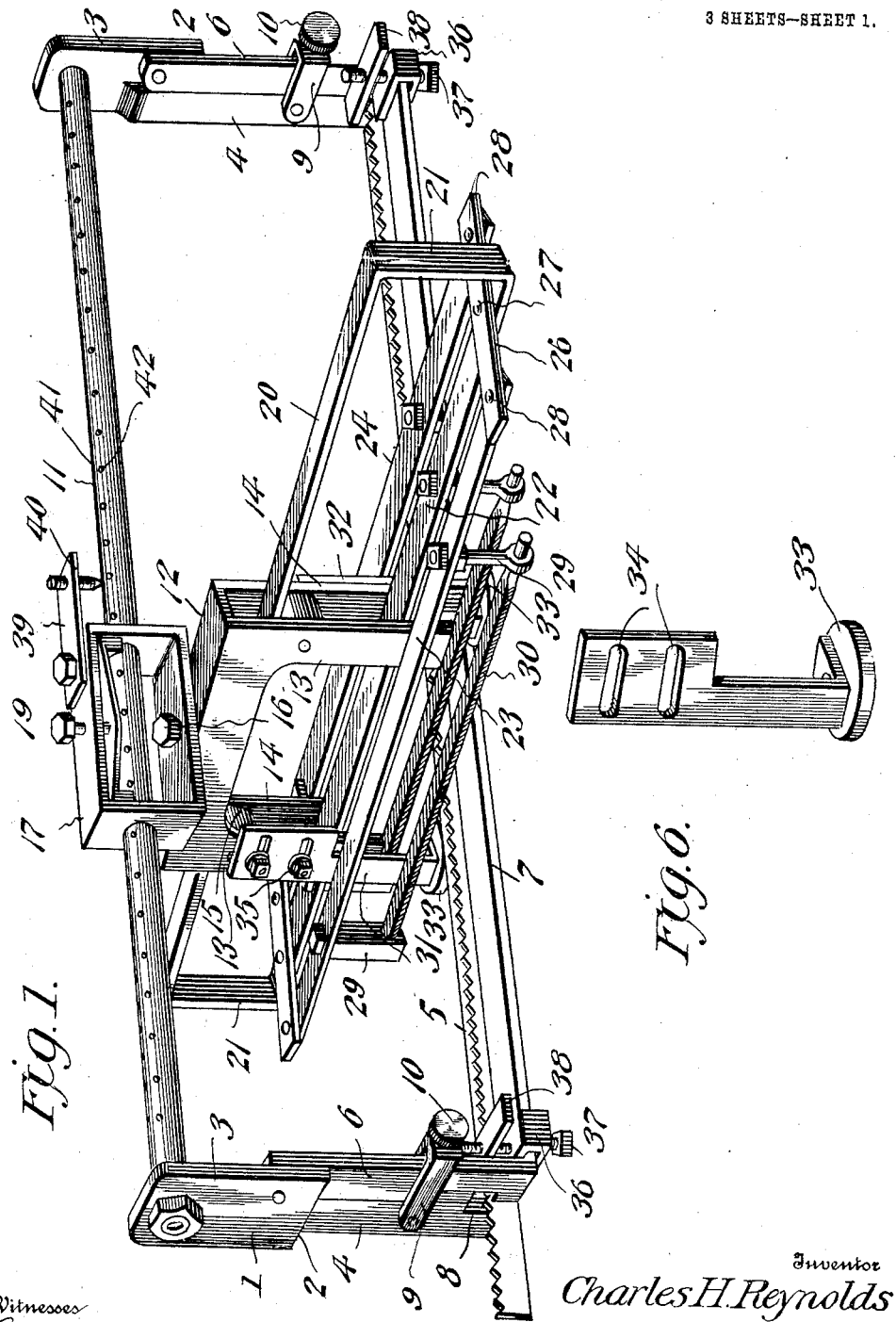
Witnesses
Geo. Ackman
C. C. Hines
Inventor
Charles H. Reynolds
By Victor J. Evans
Attorney

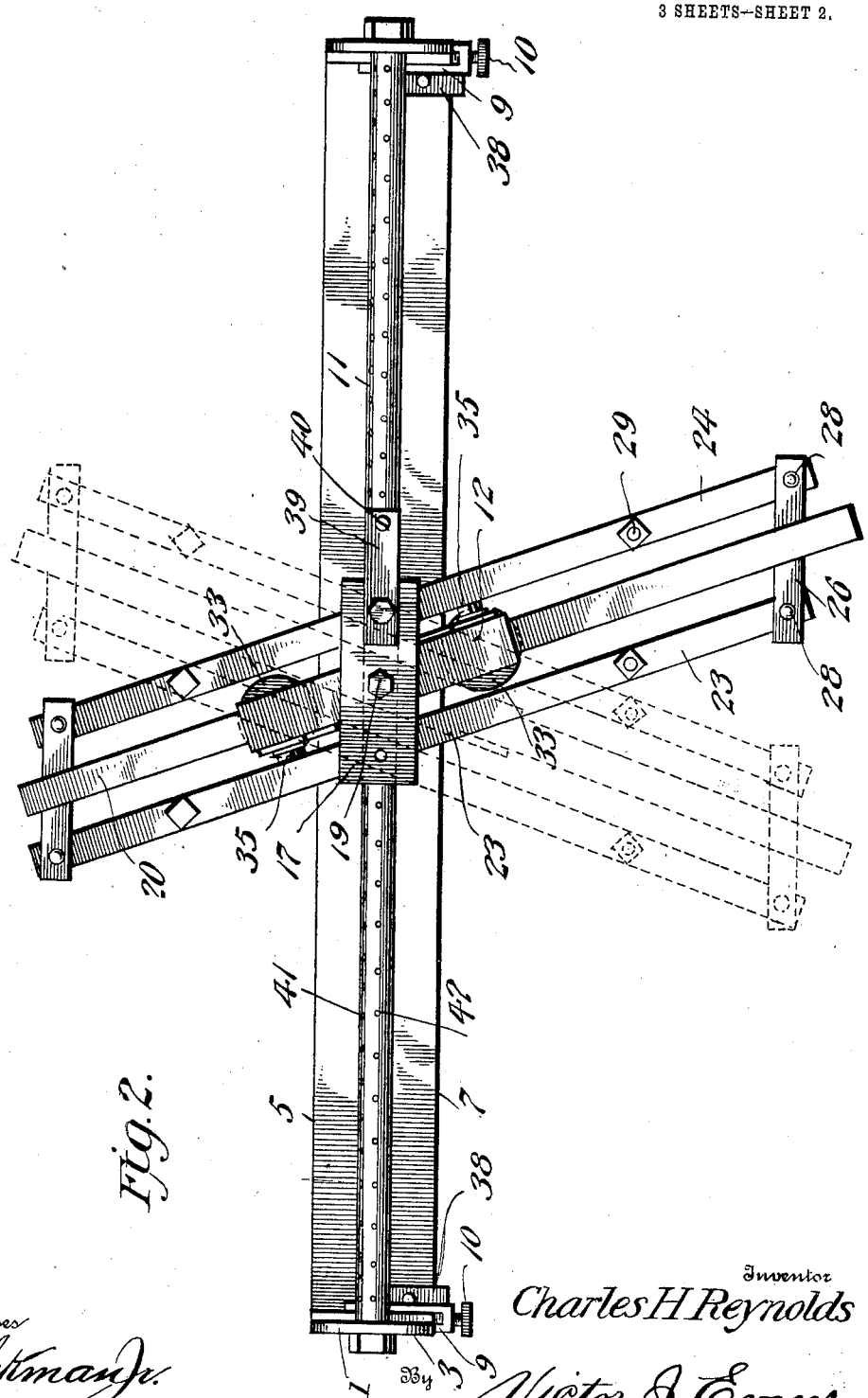

No. 826,964. PATENTED JULY 24, 1906.
C. H. REYNOLDS.
SAW SHARPENING APPARATUS.
APPLICATION FILED JUNE 14, 1905.
3 SHEETS—SHEET 3.
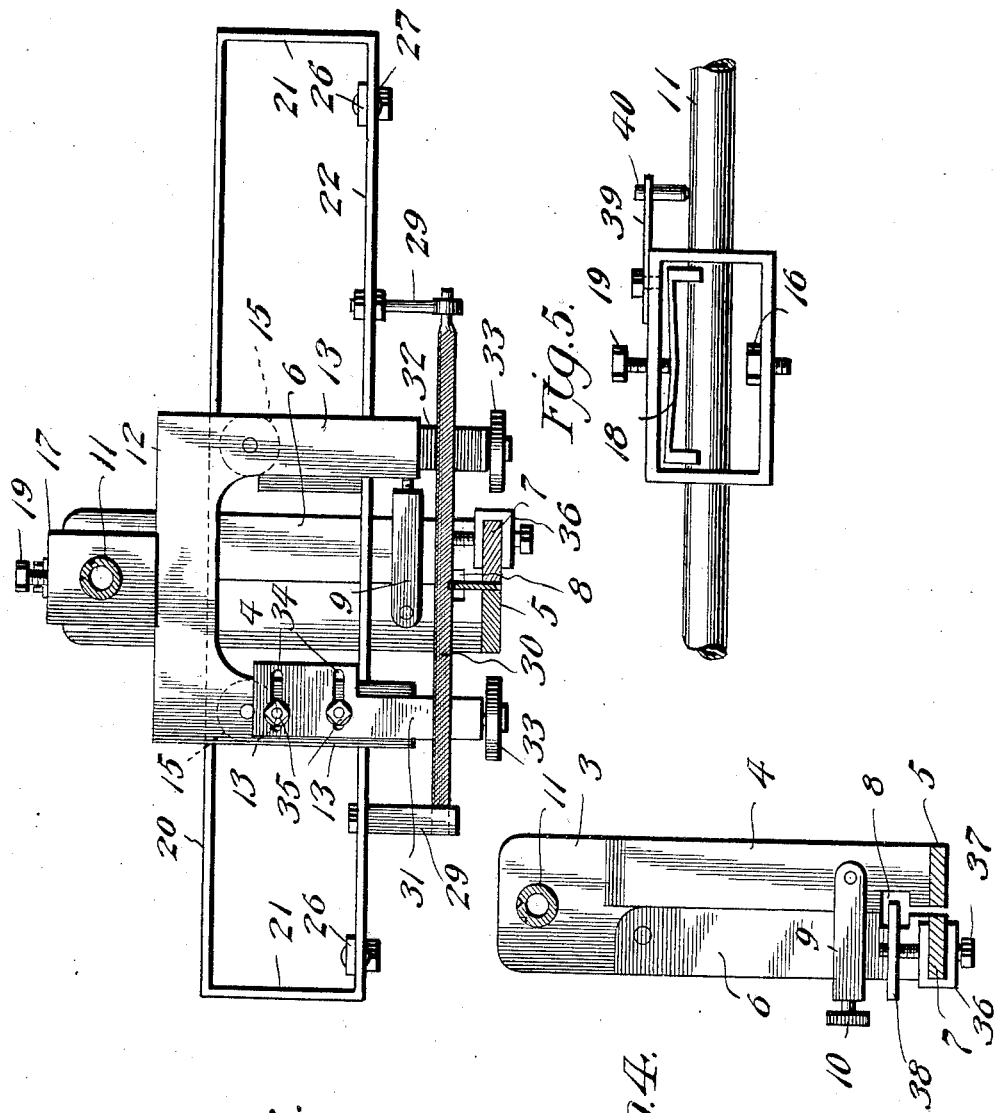
Witnesses
Geo. Hickman Jr.
C. C. Hines
Inventor
Charles H. Reynolds
By Victor J. Evans
Attorney

UNITED STATES PATENT OFFICE.

CHARLES H. REYNOLDS, OF MILAN, MISSOURI.

SAW-SHARPENING APPARATUS.

No. 826,964.  Specification of Letters Patent.  Patented July 24, 1906.

Application filed June 14, 1905. Serial No. 265,247.

*To all whom it may concern:*

Be it known that I, CHARLES H. REYNOLDS, a citizen of the United States of America, residing at Milan, in the county of Sullivan and State of Missouri, have invented new and useful Improvements in Saw-Sharpening Apparatus, of which the following is a specification.

This invention relates to a saw-sharpening apparatus, the object of the invention being to provide a saw-filing device by which either hand or band saws may be accurately, conveniently, and expeditiously filed to the desired depth and angle and in which provision is made for securely clamping the saw-blade and guiding the file-holder in its movements, so that the file or files carried thereby will be positively controlled to operate in a true path.

Another object is to provide an apparatus which admits of the use of a plurality of files and their change of position to cut at different angles and to be reversed to first act upon teeth set in one direction and then upon teeth set in the opposite direction, whereby the operation of sharpening a saw may be rapidly performed.

Still another object of the invention is to provide a saw-filing apparatus in which provision is made for adjusting the file carriage or support to adapt the position thereof to be accurately changed to set the files for operating upon the teeth of saws varying in number to the inch, and also for setting the files to operate upon alternate teeth, whereby all of the teeth of a saw set in one direction may be operated upon in one direction of movement of travel of the carriage upon its supporting-frame and the remaining teeth operated upon in the opposite direction of travel of the carriage.

The preferred embodiment of the invention is illustrated in the accompanying drawings, in which—

Figure 1 is a perspective view of the improved saw-sharpening apparatus, showing a portion of a band-saw clamped in position to be sharpened. Fig. 2 is a top plan view thereof, showing in full and dotted lines the adjustability of the file-carrier bars for operating upon oppositely-set teeth. Fig. 3 is a cross-section through the supporting-frame, showing the file-carrier in end elevation, said carrier being arranged at right angles to the frame to more clearly disclose the construction. Fig. 4 is a similar view looking toward one of the ends of the supporting-frame. Fig. 5 is a detail side elevation of the guide-rod and sliding guide-bracket of the file-carrier, and Fig. 6 is a detail view of one of the stops and gage members of the file-carrier.

Referring now more particularly to the drawings, the numeral 1 represents a supporting-frame, said frame comprising two upright end standards 2, each of said standards consisting of an upper bracket portion 3, provided with a depending stationary arm 4, the arms 4 of the two standards being suitably connected at their lower ends to a stationary clamping-bar 5. To each bracket portion 3 is pivotally connected a swinging arm 6, which normally lies parallel with the arm 4, the two arms 6 carrying at their lower ends a clamping-bar 7, which is thus rendered adjustable toward and from the bar 5, whereby a saw-blade may be positioned and clamped between said bars. The contiguous abutting edges of each stationary arm 4 and its companion swinging arm 6 are formed with registering notches to provide an opening or passage 8 of proper form for the passage of the saw and reception of the toothed edge thereof. The swinging arms 6 are adapted to be secured with the bar 7 in clamping position by fastening devices comprising stirrups or yokes 9, pivoted to the arms 4 and loosely embracing the arms 6, said stirrups being of sufficient length to permit the arms 6 to be swung outward sufficiently to admit a saw-blade between the bars 5 and 7. The stirrups or yokes carry clamping-screws 10 to engage the arms 6 and secure the bar 7 rigidly in clamping position. The bracket portions 3 of the standards 2 support a guide rod or bar 11, extending longitudinally above the clamping-bars and in parallel relation therewith.

Arranged between the clamping-bars and the guide-rod 11 is a file holder or carriage 12, which is of inverted-U form and provided at its ends with spaced depending parallel arms 13 and 14, in the upper portions of which are journaled bearing-rollers 15. The carriage 12 extends transversely of the frame 1 and is swiveled by a pivot-bolt 16 to the base portion of an open rectangular sliding bracket 17, provided in its end walls with openings for the passage of the guide-rod 11, whereby said bracket is slidably mounted thereon and adjustably supports the carriage. Within the upper portion of the bracket is arranged a spring-clamp 18, having its ends bent to form bearing portions engaging the guide-rods 11 and its central portion bowed and engaged by a set-screw 19, carried by the bracket, by which said spring is retained in position and adjusted to bear with greater or less force on the guide-rod to clamp the bracket thereto in adjusted position.

Arranged to operate in the carriage is a reciprocating file-carrier 20, comprising a bar extending through the carriage and supported by the rollers 15 and provided with downturned arms 21, supporting an intermediate file-carrier bar 22, extending between the depending arms 13 and 14 of the carriage 12, the bar 20, its depending ends 21, and the underlying carrier-bar 22 preferably being integrally constructed in the form of an oblong rectangular open frame; but they may be constructed and connected in any other preferred manner.

Arranged on opposite sides of the carriage and in parallel relation with the intermediate file-carrier bar 22 are side carrier-bars 23 and 24, the opposite extremities of said bars being connected for simultaneous movement by transverse links 26, each link being centrally pivoted by a pivot-bolt 27 to the contiguous ends of the intermediate cross-bar 22 and terminally pivoted to the adjacent ends of the side carrier-bar by clamping-screws 28. Each file-carrier bar is provided with a pair of depending hangers 29, supporting a sharpening-file 30. These hangers may be suitably constructed to permit of the adjustment of the file, if desired.

Arranged at diagonally opposite points upon the carriage 12 are stop and gage members 31 and 32, each consisting of a bracket-plate having a depending arm on which is journaled a bearing-roller 33, the upper portion of the bracket being formed with transverse slots 34 for the reception of fastening-bolts 35 to adjustably secure the same to the carriage. As shown, the member 31 is secured to one of the arms 13 of the carriage and the member 32 to the arm 14 on the opposite side of the carriage from said member 31, thus bringing the rollers 33 in position to respectively engage the outer edges of the fixed and swinging clamping-bars 5 and 7.

In practice the files 30 are disposed apart a distance equivalent to the distance between two teeth of a saw of any prescribed size, so that they will operate, respectively, on alternate teeth in order to provide for the operation of the device upon a plurality of teeth at a time in such manner that only those teeth which are set in the same direction will be acted upon. In operation the carriage 12 is swung on its pivot-bolt 16 to set it obliquely to the plane of the frame 1 to accord with the angle of inclination of one set of teeth of the saw-blade, its adjustment to the desired position being gaged by the gaging members 31 and 32, the rollers 33 of which come into contact with the edges of the bars 5 and 7, and thus determine the proper angle. Prior to the adjustment of the carriage 12 to such position the clamping-screws 28 are loosened, so that the links 26 will adjust the side carrier-bars 23 and 24 in opposite directions parallel with the intermediate bar 22 and at the same angle as said intermediate bar to the saw, the screws 28 being tightened after the parts have been adjusted to hold them permanently in adjusted position. The angle of adjustment of the carriage 12 may, it is obvious, be regulated by adjusting the gage members 31 and 32. It will thus be observed that the carriage and file-holders may be adjusted to position the files for operation upon three teeth of the saw, so that in one direction of movement of the carriage along the frame all those teeth which project in the same direction may be quickly and conveniently sharpened and that by then reversing the angular position of the carriage the saws may be arranged to operate upon those teeth of the saw which project in the opposite direction on the return movement of the carriage. As before stated, the files operate upon alternate teeth, so that after they have been once adjusted to operate upon teeth set in one direction no further adjustment will be required to operate upon the correspondingly-set teeth throughout the entire length of the saw. In adjusting the carriage 12 for operation it will be understood that it is swung on its pivot-bolt 16 and that when swung to a position at right angles to the supporting-frame the clamping-bar 7 may be adjusted without resistance for the insertion or removal of the saw. To adjust the carriage for operating upon teeth projecting in different directions, it is simply necessary to swing the carriage to positions oblique to the supporting-frame and at reverse angles thereto relative to the transverse center of the frame, as indicated in full and broken lines in Fig. 2.

In order to enable the depth of cut of the files to be regulated, the saw-gages 36 are provided for application to the opposite ends of the clamping-bar 7, each gage comprising a U-shaped clamp adapted to be slid onto the bar 7 and provided with a clamping-screw 37 to draw it in clamping engagement therewith, said screw projecting upwardly and carrying a gaging or spacing piece 38, adjustable thereon and adapted to project over the space between the bars 5 and 7 to limit the upward projection of the saw-blade therebetween, so that the position of the blade may be gaged to cut the teeth any desired depth. After a group of three teeth has been sharpened by the files the clamp 18 is relaxed and the bracket 7 slid in one direction or the other along the guide 11 to set the carriage for operation upon the next group, as will be readily understood, and this operation is continued until all the teeth of the saw have been filed.

In order to enable the movement of the carriage on the guide-bar 11 to be gaged with accuracy for setting the files for operating upon saws having teeth spaced at different distances apart, I provide upon the sliding bracket 17 a pivoted gage-piece 39, provided with a threaded gage-pin 40, having a pointed end to engage and seat in sets of gage-seats 41 and 42, formed in the bar 11. The seats of these sets 41 and 42 are arranged at different distances apart to enable the carriage 17 to be adjusted with great accuracy to set the files for operation upon saws in which the teeth are spaced a greater or less distance apart. Of course it will be understood that as the files are primarily arranged to operate upon alternate teeth the teeth of both sets are arranged apart a distance equivalent to the distance between the centers of two adjacent teeth set at the same angle, or, in other words, the width of two teeth apart, thus enabling the carriage while adjusted to travel in one direction along the bar 11 to successively act upon adjacent groups of teeth projecting in one direction and when adjusted to travel in the reverse direction on the bar to successively act upon adjacent groups of teeth projecting in the opposite direction.

It will thus be seen that the invention provides a saw-filing apparatus which is simple of construction, convenient in use, and comparatively inexpensive of production and by means of which the operation of sharpening the teeth of a saw may be expeditiously performed. By the use of the gaging devices unskilled labor may be employed at a low compensation to perform the sharpening operation, which when carried on in the ordinary manner requires the employment of highly-skilled labor.

From the foregoing description, taken in connection with the accompanying drawings, the construction and mode of operation of the invention will be understood without a further extended description.

Changes in the form, proportions, and minor details of construction may be made within the scope of the invention without departing from the spirit or sacrificing any of the advantages thereof.

Having thus described the invention, what is claimed as new is—

1. In a saw-filing apparatus, the combination of a supporting-frame provided with saw-clamping means, a bracket supported by and slidable longitudinally of the frame, a carriage pivotally supported by said bracket to swing at an angle to the frame and provided with a guideway, a saw-carrier mounted to reciprocate in said guideway and having a central file-supporting member, side saw-supporting members arranged in parallel relation to said central supporting member, and link connections between the central and side supporting members, said connections being adapted to shift said side supporting members to maintain parallel relation between the same and central supporting member when the carriage is swung to different angles with relation to the frame, said link connections having means for fastening the side supporting members in adjusted position.

2. In a saw-filing apparatus, the combination of a supporting-frame provided with a guide rod or bar, a bracket slidably mounted on said rod or bar, a carriage pivoted to the bracket, a reciprocating carrier mounted on the carriage, an intermediate file-carrier bar connected with said carrier, side carrier-bars disposed in parallel relation to the intermediate carrier-bar, and links pivotally connecting the ends of the carrier-bars, the pivotal connections between the links and carrier-bars being provided with securing means to clamp the bars in adjusted position.

3. In a saw-filing apparatus, the combination of a supporting-frame, a carriage slidably and pivotally mounted upon the frame, the latter being provided with clamping-jaws, adjustable gage members on the carriage to abut against said jaws when the carriage is set at the proper angle, and files operatively supported by the carriage.

4. In a saw-filing apparatus, a frame having a fixed and an adjustable jaw, and a gage carried by the movable jaw to regulate the insertion of the saw and depth of cut, said gage comprising a clamp embracing the jaw, a screw carried by said clamp, and a gage-piece adjustably mounted upon the screw.

5. In a saw-filing apparatus, a frame having a guide bar or rod provided with sets of seats, the seats of one set being arranged a greater distance apart than the seats of the other set, a bracket slidably mounted on said rod or bar and provided with means for securing it thereto, a carriage pivotally connected with the bracket, a reciprocating file-holder held and guided by the carriage, and a plate pivotally connected with the bracket and carrying a point to engage the said seats in the rod or bar.

In testimony whereof I affix my signature in presence of two witnesses.

CHARLES H. REYNOLDS.

Witnesses:
EDWARD SMITH,
WM. BLACKWELL.